US008219293B2

(12) United States Patent
Sato et al.

(10) Patent No.: US 8,219,293 B2
(45) Date of Patent: Jul. 10, 2012

(54) GEAR SHIFT CONTROL APPARATUS AND METHOD FOR AUTOMATIC TRANSMISSION

(75) Inventors: Osamu Sato, Fujisawa (JP); Seiji Okazaki, Utsunomiya (JP); Goh Endo, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 427 days.

(21) Appl. No.: 12/487,025

(22) Filed: Jun. 18, 2009

(65) Prior Publication Data

US 2009/0319140 A1    Dec. 24, 2009

(30) Foreign Application Priority Data

Jun. 19, 2008    (JP) ................................. 2008-160703

(51) Int. Cl.
 *F16H 61/08*    (2006.01)
(52) U.S. Cl. ................... 701/64; 701/66; 477/34
(58) Field of Classification Search .................. None
See application file for complete search history.

(56) References Cited

U.S. PATENT DOCUMENTS

| | | | |
|---|---|---|---|
| 4,671,139 A | 6/1987 | Downs et al. | |
| 4,953,090 A | 8/1990 | Narita | |
| 5,795,265 A | 8/1998 | Domian et al. | |
| 5,857,935 A | 1/1999 | Takiguchi | |
| 5,947,856 A | 9/1999 | Tabata et al. | |
| 6,259,983 B1 | 7/2001 | Tsutsui et al. | |
| 6,508,736 B2 | 1/2003 | Saito | |
| 6,514,165 B2 | 2/2003 | Saito | |
| 6,543,593 B2 * | 4/2003 | Saito | 192/48.4 |
| 6,616,576 B2 * | 9/2003 | Saito | 477/154 |
| 7,912,614 B2 | 3/2011 | Honma et al. | |
| 2002/0034999 A1 | 3/2002 | Saito | |
| 2002/0035011 A1 | 3/2002 | Saito | |
| 2002/0103049 A1 | 8/2002 | Takatori et al. | |
| 2008/0039286 A1 * | 2/2008 | Asami et al. | 477/156 |

FOREIGN PATENT DOCUMENTS

| | | |
|---|---|---|
| DE | 198 54 624 A1 | 6/1999 |
| EP | 0 719 967 A1 | 7/1996 |
| EP | 0 900 957 A2 | 3/1999 |
| EP | 1 188 965 A2 | 3/2002 |
| JP | 04-254059 A | 9/1992 |
| JP | 07-317892 A | 12/1995 |

(Continued)

OTHER PUBLICATIONS

U.S. Appl. No. 12/481,058, filed Jun. 9, 2009, Sato et al.

(Continued)

*Primary Examiner* — Michael J. Zanelli
(74) *Attorney, Agent, or Firm* — Foley & Lardner LLP

(57) ABSTRACT

In gear shift control apparatus and method for an automatic transmission, a first frictional engagement element is, in turn, released, a second frictional engagement element is, in turn, engaged to perform the gear shift to another gear stage, a command hydraulic pressure to the second frictional engagement element is temporarily reduced when a parameter indicating a degree of progress of the gear shift detected during the gear shift to the other gear stage has reached to a predetermined value representing an inertia phase finish immediate prior region at a time of an inertia phase developed during a replacement gear shift, an reduction quantity of the command hydraulic pressure is set whenever a predetermined time has elapsed on a basis of the parameter detected whenever the predetermined time has elapsed in the inertia phase finish immediate prior region to progressively reduce the command hydraulic pressure.

11 Claims, 6 Drawing Sheets

FOREIGN PATENT DOCUMENTS

| | | |
|---|---|---|
| JP | 10-047464 A | 2/1998 |
| JP | 10-047469 A | 2/1998 |
| JP | 2000-110929 A | 4/2000 |
| JP | 2000-352459 A | 12/2000 |
| JP | 2001-065682 A | 3/2001 |
| JP | 2002-089674 A | 3/2002 |

OTHER PUBLICATIONS

U.S. Appl. No. 12/487,120, filed Jun. 18, 2009, Suzuki et al.

M. Suzuki, U.S. PTO Notice of Allowance, U.S. Appl. No. 12/487,120, dated Nov. 1, 2011, 12 pages.

* cited by examiner

|  | B1<br>Fr/B | C1<br>I/C | C2<br>D/C | C3<br>H&LR/<br>C | B2<br>LOW/<br>B | B3<br>2346/<br>B | B4<br>R/B | F1 | F2 |
|---|---|---|---|---|---|---|---|---|---|
| 1st | (○) |  |  | (○) | ○ |  |  | ○ | ○ |
| 2nd |  |  |  | (○) | ○ | ○ |  |  | ○ |
| 3rd |  |  | ○ |  | ○ | ○ |  |  |  |
| 4th |  |  | ○ | ○ |  | ○ |  |  |  |
| 5th |  | ○ | ○ | ○ |  |  |  |  |  |
| 6th |  | ○ |  | ○ |  | ○ |  |  |  |
| 7th | ○ | ○ |  | ○ |  |  |  | ○ |  |
| Rev. | ○ |  |  | ○ |  |  | ○ |  |  |

INTERPOLATION CALCULATION OF P_fin

SETTING OF P1

GEAR SHIFT CONTROL APPARATUS AND METHOD FOR AUTOMATIC TRANSMISSION

BACKGROUND OF THE INVENTION (1) Field of the Invention

The present invention relates to gear shift control apparatus and method for an automatic transmission in which a command hydraulic pressure supplied to an engagement side frictional engagement element is temporarily reduced at an inertia phase finish immediately prior region developed in a midway through a progress of a gear shift.

(2) Description of Related Art

A Japanese Patent Application First Publication No. Heisei 10-47464 published on Feb. 20, 1998 (which corresponds to a U.S. Pat. No. 5,857,935 issued on Jan. 12, 1999) exemplifies a previously proposed up-shift control apparatus for the automatic transmission in which a hydraulic pressure supplied to a clutch engaged along with a gear shift is stepwise reduced to reduce a shock in a gear shift finish region when a speed ratio has reached to the speed ratio representing an inertia phase finish immediately prior region.

It should, herein, be noted that the term of "inertia phase" is one of phases developed in a midway through a progress of a gear shift and is a phase in which an input revolution speed of the automatic transmission is varied with a main cause of a variation of an inertia force (inertia) of a drive-train in which an automatic transmission is equipped. A control of a command hydraulic pressure for an engagement side frictional engagement element in which the command hydraulic pressure is temporarily reduced is carried out at the region immediately before the finish. Hence, this control is, hereinafter, called a finish pressure control.

SUMMARY OF THE INVENTION

However, in the previously proposed up-shift control apparatus for the automatic transmission described in the Background Art, the hydraulic pressure is stepwise reduced regardless of the progress of the gear shift at the inertia phase finish immediately prior region. Hence, such a problem that an effective reduction in the shock which is easy to be developed as the phase becomes nearer to the inertia phase finish at the inertia phase finish immediate prior region cannot be made occurs.

That is to say, the shock developed at the inertia phase finish region is developed due to a rise or un-stability in a frictional coefficient of a frictional engagement element as a relative revolution speed of engagement side frictional engagement element becomes smaller, namely, as it approaches more to a finish of the inertia phase. It should be noted that the shock developed at this time is called a rooster tail shock from a shape of an output shaft torque characteristic.

Whereas, in the finish pressure control, a reduction gradient of an engagement pressure effective to a shock reduction in a feed-forward control is tried to be set. A time it takes from an inertia phase finish time to an inertia phase finish immediate prior time needs to be set and a reduction quantity of the hydraulic pressure whenever a predetermined time is elapsed needs to previously be optimized and designed. In this case, many development man-hour and tuning man-hour are required. In addition, due to an influence of deviations, external disturbances, aging degradations, required time, and hydraulic pressure reduction are deviated from optimum ranges. The development of the shock is allowed.

It is an object of the present invention to provide gear shift control apparatus for an automatic transmission and gear shift control method therefor which are capable of reducing the shock effectively generated in the inertia phase finish region without requiring many development man-hours and tuning man-hours during the inertia phase developed during a replacement gear shift.

According to one aspect of the present invention, there is provided a gear shift control apparatus for an automatic transmission, comprising: a gear shift control section configured to release a first frictional engagement element which has been engaged at a gear stage prior to a gear shift and to engage a second frictional engagement element which has been released at the gear stage prior to the gear shift to perform the gear shift to another gear stage; and an inertia phase control section configured to temporarily reduce a command hydraulic pressure to the second frictional engagement element when a parameter indicating a degree of progress of the gear shift detected during the gear shift to the other gear stage has reached to a predetermined value representing an inertia phase finish immediate prior region at a time of an inertia phase developed during a replacement gear shift, wherein the inertia phase control section includes a finish pressure control section configured to set a reduction quantity of the command hydraulic pressure whenever a predetermined time has elapsed on a basis of the parameter detected whenever the predetermined time has elapsed in the inertia phase finish immediate prior region to progressively reduce the command hydraulic pressure.

According to another aspect of the present invention, there is provided a gear shift control method for an automatic transmission, comprising: while releasing a first frictional engagement element which has been engaged at a gear stage prior to a gear shift, engaging a second frictional engagement element which has been released at the gear stage prior to the gear shift to perform the gear shift to another gear stage; and temporarily reducing a command hydraulic pressure to the second frictional engagement element when a parameter indicating a degree of progress of the gear shift detected during the gear shift to the other gear stage has reached to a predetermined value representing an inertia phase finish immediate prior region at a time is of an inertia phase developed during a replacement gear shift, wherein a reduction quantity of the command hydraulic pressure is set whenever a predetermined time has elapsed on a basis of the parameter detected whenever the predetermined time has elapsed in the inertia phase finish immediate prior region to progressively reduce the command hydraulic pressure.

The other objects and features of the present invention will become understood from the following description with reference to the accompanying drawings.

DETAILED DESCRIPTION OF THE INVENTION

Reference will hereinafter be made to the drawings in order to facilitate a better understanding of the present invention.

Preferred Embodiment

Figure 1:
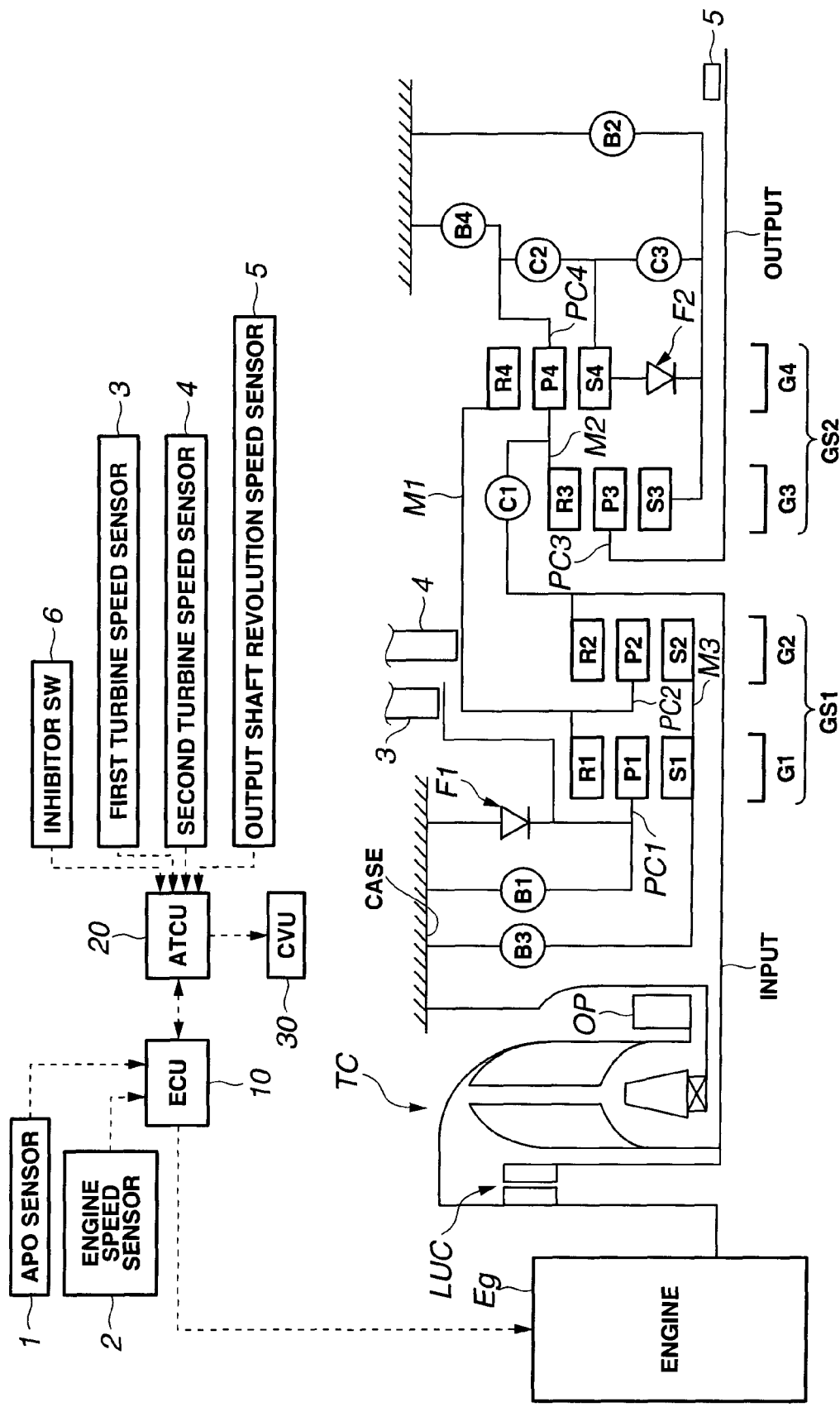
FIG. 1 is a skeleton view of one example of an automatic transmission to which a gear shift control apparatus in a preferred embodiment according to the present invention is applicable.

FIG. 1 shows a skeleton diagram showing one example of an automatic transmission to which a gear shift control apparatus in a preferred embodiment according to the present invention is applicable.

An automatic transmission in the preferred embodiment is a stepped gear automatic transmission of a forward seventh speed and a reverse first speed. A driving force of an engine Eg is inputted to the automatic transmission from an input shaft Input via a torque converter TC and a revolution speed thereof is gear shifted by means of four planetary gears and seven frictional engagement elements to be outputted from an output shaft Output. In addition, an oil pump OP on the same axle as an pump impeller of torque converter TC is installed which is rotationally driven according to a driving force of engine Eg so that a pressure application to oil by oil pump OP is carried out.

In addition, a vehicle further includes: a control valve unit 30 (CVU) which controls a hydraulic pressure of each frictional engagement element on a basis of an output signal of an automatic transmission controller (ATCU) 20 as will be described below; and an engine controller 10 (ECU) which controls a drive state of engine Eg. Automatic transmission controller 20 (ATCU) controls a shift state of the automatic transmission and so forth. It should be noted that engine controller 10 and automatic transmission controller 20 are connected via a CAN (Computer Area Network) communication line to be shared with a sensor information and a control information through a communication line or so forth.

Engine controller 10 is connected with an accelerator opening angle sensor (APO sensor) 1 configured to detect a manipulated variable of an accelerator (pedal) by a vehicle driver and an engine speed sensor 2 configured to detect an engine speed. Engine controller 10 controls a fuel injection quantity and a throttle opening angle on a basis of the engine speed and the accelerator (pedal) manipulated variable. This engine controller 10 controls a fuel injection quantity and a throttle opening angle on a basis of the engine speed and accelerator pedal manipulated variable to control an engine output revolution speed and an engine torque.

Automatic transmission controller 20 described above is connected to a first turbine revolution speed sensor 3 configured to detect a revolution speed of a first carrier PC1, to a second turbine revolution speed sensor 4 configured to detect a revolution speed of a first ring gear R1, to an output shaft revolution speed sensor 5 configured to detect a revolution speed of output shaft Output; and an inhibitor switch (SW) 6 configured to detect a range position selected through a shift lever of the automatic transmission by the vehicle driver. Then, during a selection of D (Drive) range through the shift lever, an optimum command shift stage is selected on a basis of vehicle speed Vsp and accelerator opening angle APO representing the accelerator pedal manipulated variable and a control command to achieve a command gear shift stage (a gear shift step) is outputted to control valve unit (CVU) 30.

Next, a shift gear mechanism interposed between input shaft Input and output shaft Output will be described hereinbelow.

On a shaft extended from input shaft Input to output shaft Output, a first planetary gear set GS1 according to first planetary gear G1 and second planetary gear G2 and a second planetary gear set GS2 according to a third planetary gear G3 and a fourth planetary gear G4 are arranged in this sequence. In addition, as frictional engagement elements a first clutch C1, a second clutch C2, a third clutch C3, a first brake B1, a second brake B2, a third brake B3, and a fourth brake B4 are arranged. In addition, a first one-way clutch F1 and a second one-way clutch F2 are arranged.

First planetary gear G1 is a single pinion planetary gear having a first sun gear S1, a first ring gear R1, and a first carrier PC1 supporting a first pinion P1 meshed with both of first sun gear R1 and first ring gear R1.

Second planetary gear G2 is a single pinion planetary gear having a second sun gear S2, a second ring gear R2, a second carrier PC2 supporting a second pinion P2 meshed with both of second sun gear S2 and second ring gear R2.

Third planetary gear G3 is a single pinion planetary gear having a third sun gear S3, a third ring gear R3, a third carrier PC3 supporting a third pinion P3 meshed with both of third sun gear S3 and third ring gear R3.

Fourth planetary gear G4 is a single pinion planetary gear having a fourth sun gear S4, a fourth ring gear PC4 supporting fourth pinion P4 meshed with both of fourth sun gear S4 and fourth ring gear R3.

Input shaft Input is linked with second ring gear R2 to input the rotational driving force from engine Eg via torque converter TC. Output shaft Output is linked with third carrier PC3 so that an output rotational driving force is transmitted to drive wheels via a final gear or so forth.

First ring gear R1, second carrier PC2, and fourth ring gear R4 are integrally linked to each other via a first linkage member M1. Third ring gear R3 and fourth carrier PC4 are integrally linked to each other via a second linkage member M2. First sun gear S1 and second sun gear S2 are integrally linked to each other via a third linkage member M3.

First planetary gear set GS1 is constituted by four rotational elements by linking integrally first planetary gear G1 and second planetary gear G2 by means of first linkage member M1 and third linkage member M3. In addition, second planetary gear set GS2 is constituted by five rotational elements by linking third planetary gear G3 and fourth planetary gear G4 via a second linkage member M2.

In first planetary gear set GS1, the torque is inputted from input shaft Input to second ring gear R2 and the inputted torque is outputted to second planetary gear set GS2 via first linkage member M1. In second planetary gear set GS2, the torque is inputted from input shaft Input directly via second linkage member M2 and the inputted torque is outputted to output shaft Output from a third carrier PC3.

First clutch C1 (an input clutch I/C) is a clutch which selectively connects and disconnects between input shaft Input and second linkage member M2. Second clutch C2 (a direct clutch D/C) is a clutch which selectively connects and disconnects fourth sun gear S4 and fourth carrier PC4. Third clutch C3 (H&LR clutch H&LR/C) is a clutch which selectively connects and disconnects third sun gear S3 and fourth ring gear R4.

In addition, second one-way clutch F2 is interposed between third sun gear S3 and fourth sun gear S4. Thus, when third clutch C3 is released and and when a revolution speed of fourth sun gear S4 is larger (higher) than third sun gear S3, a revolution speed of second one-way clutch F2 which is independent of third sun gear S3 and fourth sun gear S4 is developed. Then, third planetary gear S3 and fourth sun gear S4 are connected together via second linkage member M2 so that their respective planetary gears achieve independent gear ratios.

First brake B1 (a front brake Fr/B) is a brake which selectively stops the rotation of first carrier PC1 with respect to a transmission casing CASE. In addition, first one-way clutch F1 is juxtaposed to first brake B1. Second brake B2 (a low brake LOW/B) is a brake which selectively stops the rotation of third sun gear S3 with respect to transmission casing CASE. A third brake B3 (a 2346 brake 2346/B) is a brake which selectively stops the rotation of third linkage member M3 linking first sun gear S1 and second sun gear S2 with respect to transmission casing CASE. A fourth brake B4 (a reverse brake R/B) is a brake which selectively stops the rotation of fourth carrier PC3 with respect to transmission casing CASE.

Figures 2, 3:
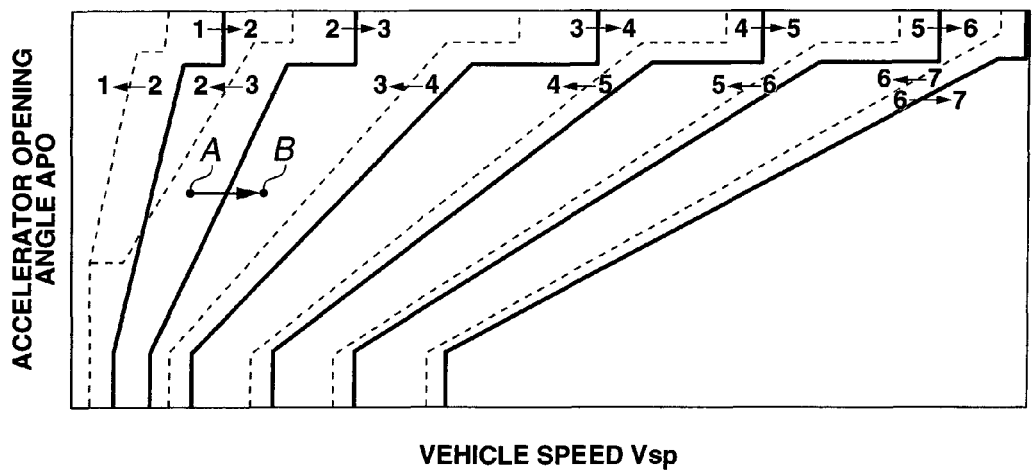
FIG. 2 is an engagement operation table representing an engagement state of each frictional engagement element for each gear shift stage in the automatic transmission to which the gear shift control apparatus in the embodiment according to the present invention is applicable.
FIG. 3 is a gear shift line diagram indicating one example of a gear shift map used in a gear shift control during a selection of a D (Drive) range in the automatic transmission in this embodiment according to the present invention.

FIG. 2 is an engagement operation table representing an engaged state of each of frictional engagement elements for each shift stage in an automatic transmission to which the gear shift control apparatus in the embodiment described above is applicable. In FIG. 2, ◯ mark denotes an engaged state of the corresponding one of the frictional engagement elements, (◯) mark denotes the engaged state of the corresponding one of the frictional engagement elements when a range position at which the engine brake is operated is selected, and a blank (no mark) denotes a released state of the corresponding one of the frictional engagement elements.

The engagement state of the respective frictional engagement elements installed in the gear shift mechanism described above achieves shift stages of forward 7-th speed and reverse first speed as will be described below such that, in an up-shift and a down-shift between mutually adjacent gear stages (adjacent steps), one of the frictional engagement elements which has been engaged is released and one of the frictional engagement elements which has been released is engaged. It should be noted that the replacement gear shift means, so-called, a clutch-to-clutch shift such that, while the frictional engagement element which has been engaged at one of gear stages before the gear shift is released, the frictional engagement element which has been released at the corresponding one of the gear stages before the gear shift is engaged to make the gear shift to another gear stage.

That is to say, in a "a first speed range", only second brake B2 is in an engagement state. Thus, first one-way clutch F1 and second one-way clutch F2 are engaged. In a "second speed range", second brake B2 and third brake B3 are engaged and second one-way clutch F2 is engaged. In a "third speed range", second brake B2, third brake B3, and second clutch C2 are in the engagement state and neither first one-way clutch F1 nor second one-way clutch C2 is engaged. In a "fourth speed range", third brake B3, second clutch C2, and third clutch C3 are in the engagement state. In a "fifth speed range", first clutch C1, second clutch C2, and third clutch C3 are in the engagement state. In a "sixth speed range", first brake B1, first clutch C1, and third clutch C3 are in the engagement state. In a "seventh speed range", first brake B1, first clutch C1, and third clutch C3 are in the engagement state and first one-way clutch F1 is engaged. In a "reverse speed range", fourth brake B4, first brake B1, and third clutch C3 are in the engagement state.

FIG. 3 shows a shift diagram representing one example of a shift map used in the shift control at a time of D (Drive) range selection in the automatic transmission in the embodiment described above. In FIG. 3, a solid line denotes an up-shift line and a dotted line denotes a down-shift line.

During the selection of D (Drive) range, a search is made for a position at which a drive point determined on a basis of vehicle speed Vsp from output shaft revolution speed sensor 5 (=vehicle speed sensor) and accelerator opening angle APO from accelerator opening angle (APO) sensor 1 is present on the shift map. Then, if the drive point does not move or if the drive point is present within a single shift range region on the shift map in FIG. 3, the (present) gear stage (step) at that time is maintained as it is. On the other hand, if the drive point is moved to cross over an up-shift line on the shift map in FIG. 3, an up-shift command is issued to up-shift the shift stage from one of the gear shift stages represented by a region in which the drive point before the crossing is present to another gear shift stage represented by a region in which the drive point after the crossing is present. In addition, if the drive point is moved to cross over a down-shift line in the shift map in FIG. 3, a down-shift command is issued to down-shift the shift stage from one of the gear shift stages represented by a region in which the drive point before the crossing is present to another gear shift stage represented by a region in which the drive point after the crossing is present.

Figure 4:
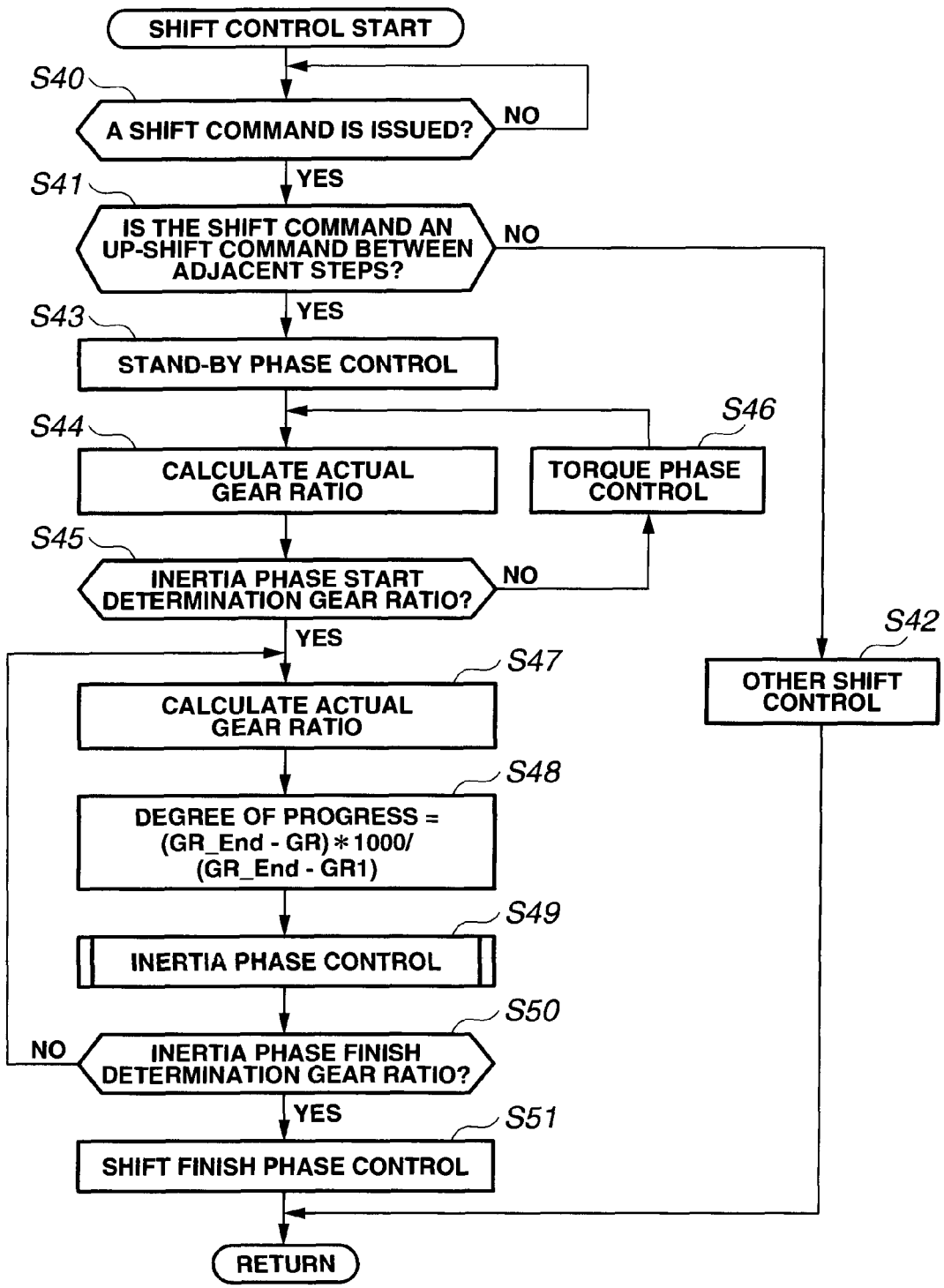
FIG. 4 is a flowchart representing a flow of a gear shift control procedure when an up-shift command is issued during a selection of the D range executed in an automatic transmission controller 20 in this embodiment according to the present invention.

FIG. 4 shows a flowchart representing a flow of a gear shift control procedure when the up-shift command is issued during the selection of the D range executed by automatic transmission controller 20 in the embodiment described above. Hereinafter, an explanation on each step described in FIG. 4 will be made (the steps shown in FIG. 4 represent a gear shift control section (means)). It should be noted that, during the gear shift control procedure, the shift command (an up-shift command and a down-shift command) is always read during the gear shift control procedure.

At a step S40, automatic transmission controller 20 determines whether the shift command is issued during the selection of D range. If the shift command is present (Yes), the routine goes to a step S41. If no shift command is issued (No), the routine repeats the process of step S40.

At step S41, automatic transmission controller 20 determines whether the issued shift command is the up-shift command between adjacent gear shift stages (adjacent steps) at which the gear shift control of the up-shift due to the replacement gear shift after the determination that the shift command has been issued at step S40. If Yes (the shift command is the up-shift command between the adjacent stages (steps)), the routine goes to a step S43. If No (the shift command is not the up-shift command between the adjacent stages (steps)), the routine goes to a step S42.

At step S42, automatic transmission controller 20 after the determination that the shift command determined at step S41 is one of the other commands than the up-shift command between the adjacent shift stages, the other shift control (the up-shift to the shift control to the shift stage which is equal to or lager than two stages (so-called, a skip gear shift) the down-shift command between the adjacent shift stages, the down-shift command to the stages equal to or other than the adjacent shift stages, and so forth) is executed and the routine goes to a return process.

For example, in a case where the up-shift command from the second speed range (a first gear shift stage) to the third speed range (a second gear shift stage), second clutch C2 is engaged and third clutch C3 is released to start the up-shift from the second speed range to the third speed range. In addition, a stand-by phase control is a control in which oil is filled within a piston chamber, a gap between clutch plates is eliminated, and a clutch plate engagement thereafter due to a hydraulic pressure supply makes a torque transmission possible and is executed up to a time duration of a timer set from a time at which an output of the up-shift command is carried out.

At a step S44, subsequent to the stand-by phase control at step S43 or subsequent to a torque phase control at a step S46, an actual gear ratio GR is calculated, and a routine goes to a step S45. At a step S45, automatic transmission controller (ATCU) 20 determines whether, subsequent to the calculation of actual gear ratio GR at step S44, calculated actual gear ratio GR (the present gear ratio) has reached to an inertia phase start determination gear ratio GR_St. If YES (actual gear ratio GR has reached to inertia phase start determination gear ratio GR_St), the routine goes to a step S47. If NO (actual gear ratio GR does not yet reach to inertia phase start determination gear ratio GR_St), the routine goes to a step S46.

At step S46, automatic transmission controller 20 executes an engagement pressure control and a release pressure control according to the torque phase control for the engagement side frictional engagement element related to the up-shift and the release side frictional engagement element related to the up-shift, subsequent to the determination that actual gear ratio GR does not reach to inertia phase start determination gear ratio GR_St, subsequent to the determination that actual gear ratio GR at step S45 doe not reach to inertia phase start determination gear ratio GR_St and the routine returns to step S44. It should be noted that the term of "torque phase" is a phase generated in a midway through the progress of the gear shift and refers to a phase in which an input rotation does not vary but only an output shaft torque varies.

At a step S47, automatic transmission controller 20 calculates actual gear ratio GR according to the transmission input revolution speed obtained from first turbine revolution speed sensor 3 and second turbine revolution speed sensor 4 and the transmission output shaft revolution speed obtained from output shaft revolution speed sensor 5. in the same way as step S44, subsequent to the determination that actual gear ratio GR has reached to inertia phase start determination gear ratio GR_St at step S45 and subsequent to the determination that actual gear ratio GR does not yet reach to inertia phase start determination gear ratio GR_End at step S50. Then, the routine goes to a step S48.

At step S48, subsequent to the calculation of the actual gear ratio at step S47, automatic transmission controller 20 calculates a degree of progress of the up-shift and calculates a degree of progress of the up-shift according to an equation (1) described below. Then, the routine goes to a step S49.

$$\text{Degree of progress} = (GR\_End - GR) * 1000 / (GR\_End - GR1) \tag{1}$$

It should be noted that GR denotes present actual gear ratio, GR_End denotes an inertia phase finish determination gear ratio, and GR1 denotes an inertia phase finish immediate prior gear ratio. It should be noted that the term of "degree of progress" indicates a value of how degree the gear shift has progressed which is reduced along with the progress of the gear shift. In the case of equation (1), the degree of progress$\geq 1000$ (the degree of progress when GR1=1000) from inertia phase start determination gear ratio GR_St to inertia phase finish immediate prior gear ratio GR1. In addition, the degree of progress=0 when actual gear ratio GR is inertia phase finish determination gear ratio GR_End.

Figure 5:
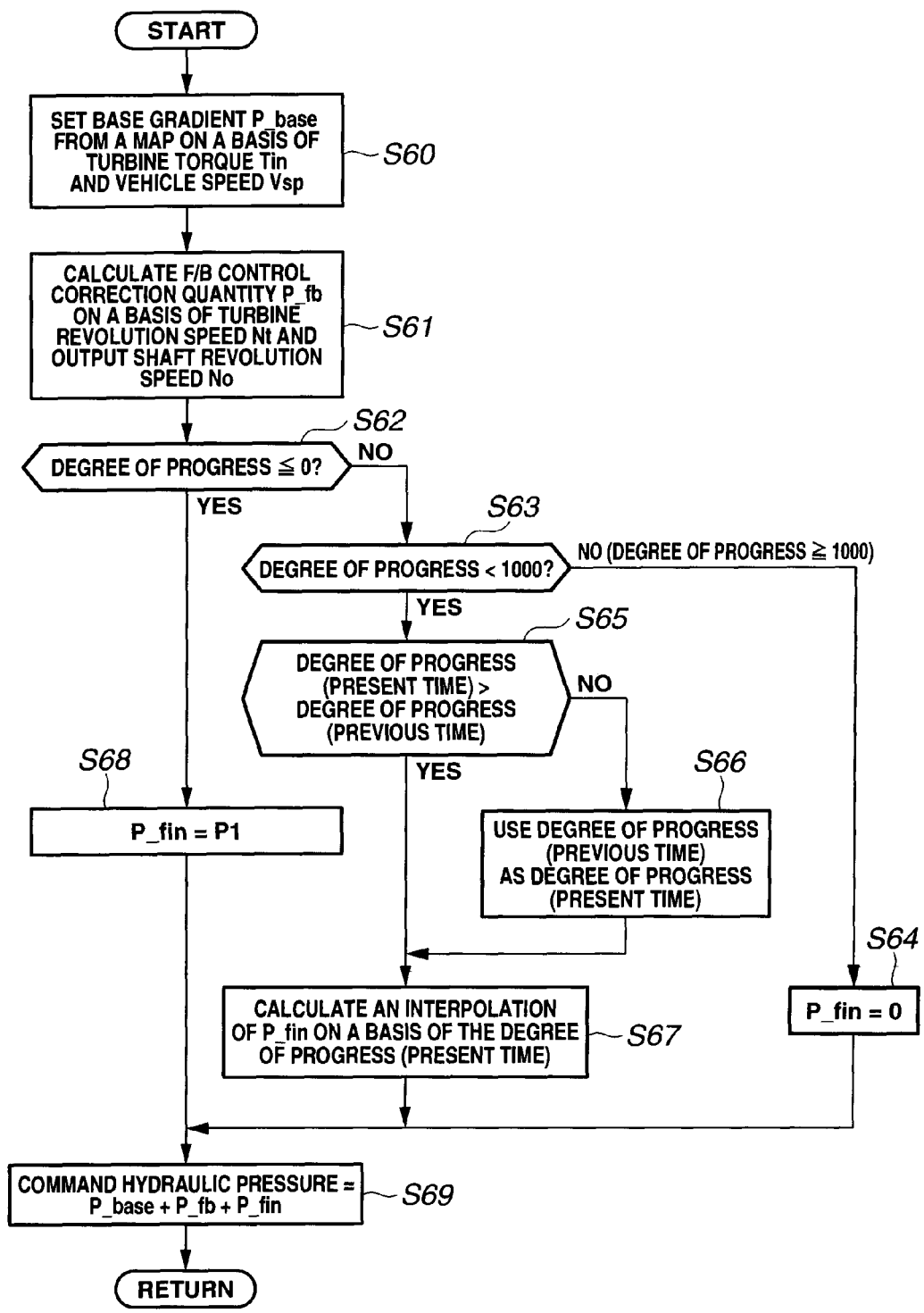
FIG. 5 is a flowchart representing a flow of an inertia phase control procedure executed in automatic transmission controller 20 in this embodiment.

At step S49, automatic transmission controller 20 executes an inertia phase control in accordance with the flowchart shown in FIG. 5 and the routine goes to a step S50.

At step S50, automatic transmission controller 20 determines whether actual gear ratio GR has reached to inertia phase finish determination gear ratio GR_End subsequent to the execution of the inertia phase control at at step S49. If Yes at step S50, the routine goes to a step S51. If NO at step S50, the routine returns to step S47.

At step S51, automatic transmission controller 20 executes the gear shift finish phase control, subsequent to the determination that actual gear ratio GR has reached to inertia phase finish determination flag GR_End at step S50, and the routine goes to the return process. It should be noted that the gear shift finish phase control is a control in which the engagement pressure to engagement side frictional engagement element during the up-shift is raised to a line pressure and the release pressure of the release side frictional engagement element is reduced to a drain pressure.

Figure 6A:
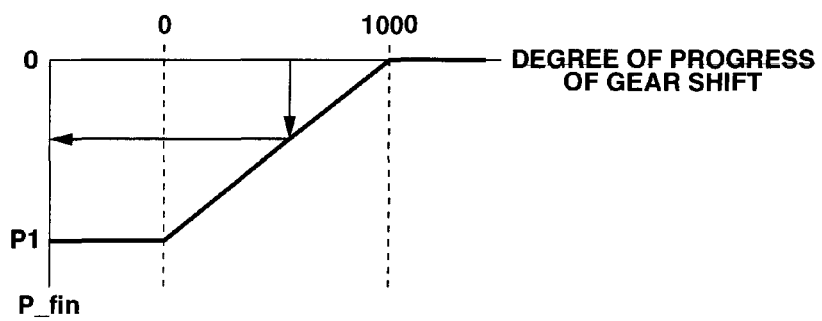
FIGS. 6A and 6B are diagrams representing how to determine a reduction quantity P_fin of a command hydraulic pressure in a finish pressure control in accordance with a degree of progress in an inertia phase control procedure executed by automatic transmission controller 20 in the embodiment, FIG. 6A representing reduction quantity P_fin of command hydraulic pressure P in the finish pressure control in accordance with the degree of progress of the gear shift in the inertia phase control procedure executed by automatic transmission controller 20 in the embodiment described above and FIG. 6B representing a maximum reduction quantity P1 with respect to a turbine torque.
Figure 6B:
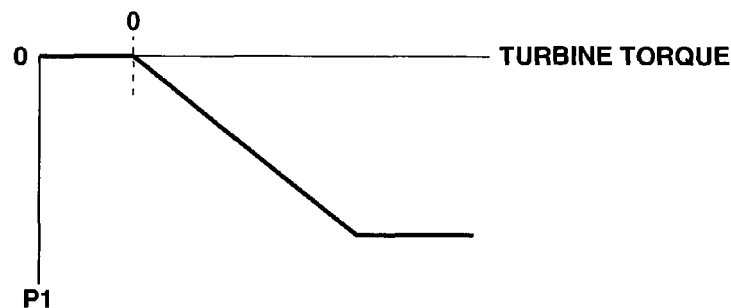
Figure 7:
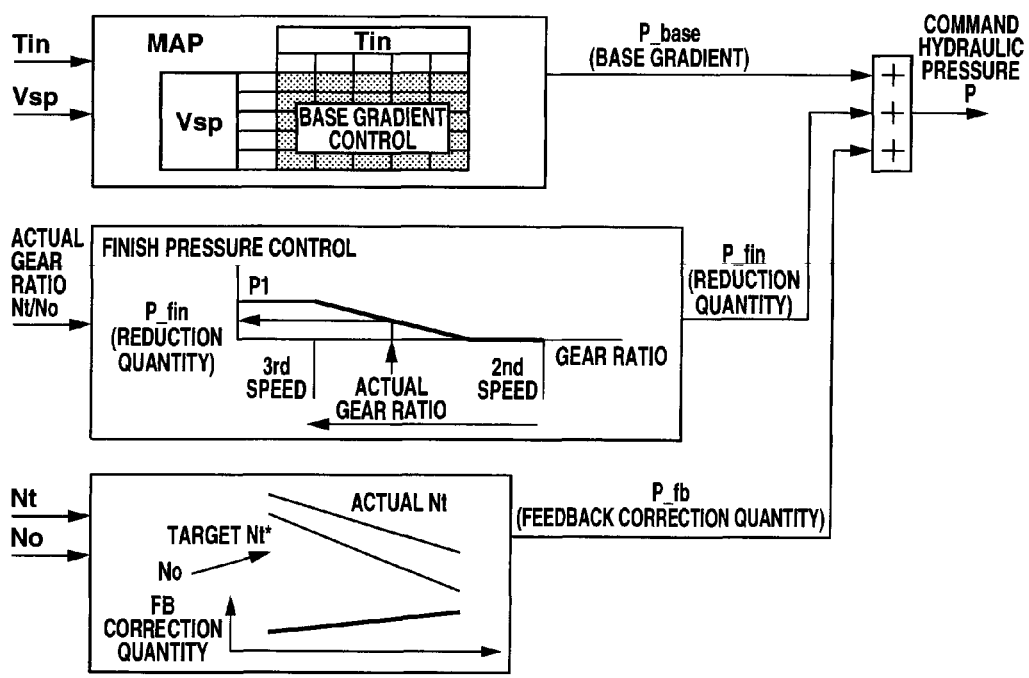
FIG. 7 is an inertia phase control block representing a control concept in which a final command hydraulic pressure P is obtained by adding a base gradient P_base, reduction quantity P_fin, and a feedback (FB or F/B) correction quantity P_fb in an inertia phase control executed by automatic transmission controller 20 in the embodiment described above according to the present invention.

FIG. 5 is a flowchart representing a process of flow on an inertia phase control procedure executed by automatic transmission controller 20 in the embodiment (inertia phase control means (an inertia phase control section)). FIGS. 6A and 6B show diagrams of how to decide a reduction quantity P_fin of command hydraulic pressure P in the finish pressure control in accordance with the degree of progress in the inertia phase control procedure executed by automatic transmission controller 20 in the embodiment. FIG. 6A shows an interpolation calculation of reduction quantity P_fin with respect to the degree of progress and FIG. 6B shows a maximum reduction quantity P1 with respect to a turbine torque. FIG. 7 shows an inertia phase control block diagram representing a control concept in which a final command hydraulic pressure P at the initial phase control executed by automatic transmission controller 20 in the embodiment from a total calculation (addition) of a base gradient P_base, reduction quantity P_fin, and FB (feedback) correction quantity P_fb.

This inertia phase control is applicable to engagement side frictional engagement element on the up-shifting. Then, at the gear shift control procedure in FIG. 4, the routine goes to step S49 to start the inertia phase control procedure. After the start of the inertia phase control, while reading the degree of progress of the gear shift at any time calculated at the gear shift control procedure in FIG. 4, the procedure in FIG. 5 is simultaneously progressed and the routine goes to step S51 in the gear shift control procedure in FIG. 4 so that the routine of the inertia phase control is finished. Hereinafter, each step constituting the flowchart of FIG. 5 will be explained below.

At a step S60, base gradient P_base is set from a map on a basis of a turbine torque Tin obtained through a calculation and vehicle speed Vsp obtained from output shaft revolution speed sensor 5, as shown in FIG. 7. Then, the routine goes to a step S61.

At step S61, subsequent to the set of base gradient P_base at step S60, automatic transmission controller 20 calculates feedback correction quantity P_fb on a basis of a turbine revolution speed Nt obtained from first turbine revolution speed sensor 3 and second turbine revolution speed sensor 4 and an output shaft revolution speed No obtained from output shaft revolution speed sensor 5 and the routine goes to a step S62. This FB (feedback) correction quantity P_fb is calculated when a target turbine revolution speed Nt* is derived according to output shaft revolution speed No, as shown in FIG. 7, and is calculated to a value thereof in accordance with a deviation between target turbine revolution speed Nt* and actual turbine revolution speed Nt.

At step S62, automatic transmission controller 20 reads the degree of progress calculated at the shift control procedure shown in FIG. 4 subsequent to the calculation of FB correction quantity P_fb at step S61 and determines whether this degree of progress is equal to zero or a negative value. If YES (degree of progress≦0) at step S62, the routine goes to a step S68. If NO (degree of progress>0) at step S62, the routine goes to a step S63.

At step S63, automatic transmission controller 20 reads the degree of progress calculated in the gear shift control procedure shown in FIG. 4 subsequent to the determination that the degree of progress is larger than zero (>0) and determines whether the degree of progress is smaller than 1000. If YES (degree of progress<1000) at step S63, the routine goes to a step S65. If NO (degree of progress≦0) at step S63, the routine goes to a step S64.

At step S64, subsequent to the determination that the degree of progress at step S61>0, reduction quantity P_fin is set to P_fin=0 and the routine goes to a step S69.

At step S65, automatic transmission controller 20 determines whether the present degree of progress is in excess of a previous degree of progress subsequent to the determination that degree of progress<1000 at step S63. In details, automatic transmission controller 20 determines whether the gear shift is advanced toward the up-shift side. If YES (present degree of progress>previous degree of progress) at step S65, the routine goes to a step S67. If NO (present degree of progress≦previous degree of progress) at step S65, the routine goes to a step S66.

At step S66, automatic transmission controller 20 uses the previous degree of progress as the present degree of progress subsequent to the determination that the present degree of progress at step S65≦previous degree of progress and the routine goes to a step S67.

At step S67, automatic transmission controller 20 performs the interpolation calculation of reduction quantity P_fin on a basis of the present degree of progress, subsequent to the determination that the present degree of progress>previous degree of progress at step S65 or subsequent to the rewrite of the present degree of progress at step S66 (=previous degree of progress). Then, the routine goes to step S69. It should, herein, be noted that reduction quantity P_fin of command hydraulic pressure P in the finish pressure control is determined through the interpolation calculation so that reduction quantity P_fin is reduced in accordance with the decrease in the degree of progress so that P_fin=P1 (maximum reduction quantity) when the degree of progress is zero if P_fin=0 when the degree of progress is 1000. It should also be noted that, as turbine torque Tin (input torque to the transmission) becomes larger, maximum reduction quantity P1 is determined to have the characteristic in a proportional reduction.

At a step S68, subsequent to a determination that degree of progress at step S62≦0, reduction quantity P_fin of command hydraulic pressure P in the finish pressure control is set to P_fin=P1 (maximum reduction quantity) and the routine goes to step S69.

At a step S69, command hydraulic pressure P supplied to the engagement side frictional engagement element during the up-shift, as shown in FIG. 7, is obtained by totally calculating (adding) base gradient P_base, reduction quantity P_fin, and FB (feedback) correction quantity P_fb together. Then, the routine goes to the return process. It should be noted that steps S62 through S68 correspond to a finish pressure control section (means).

Figure 8:
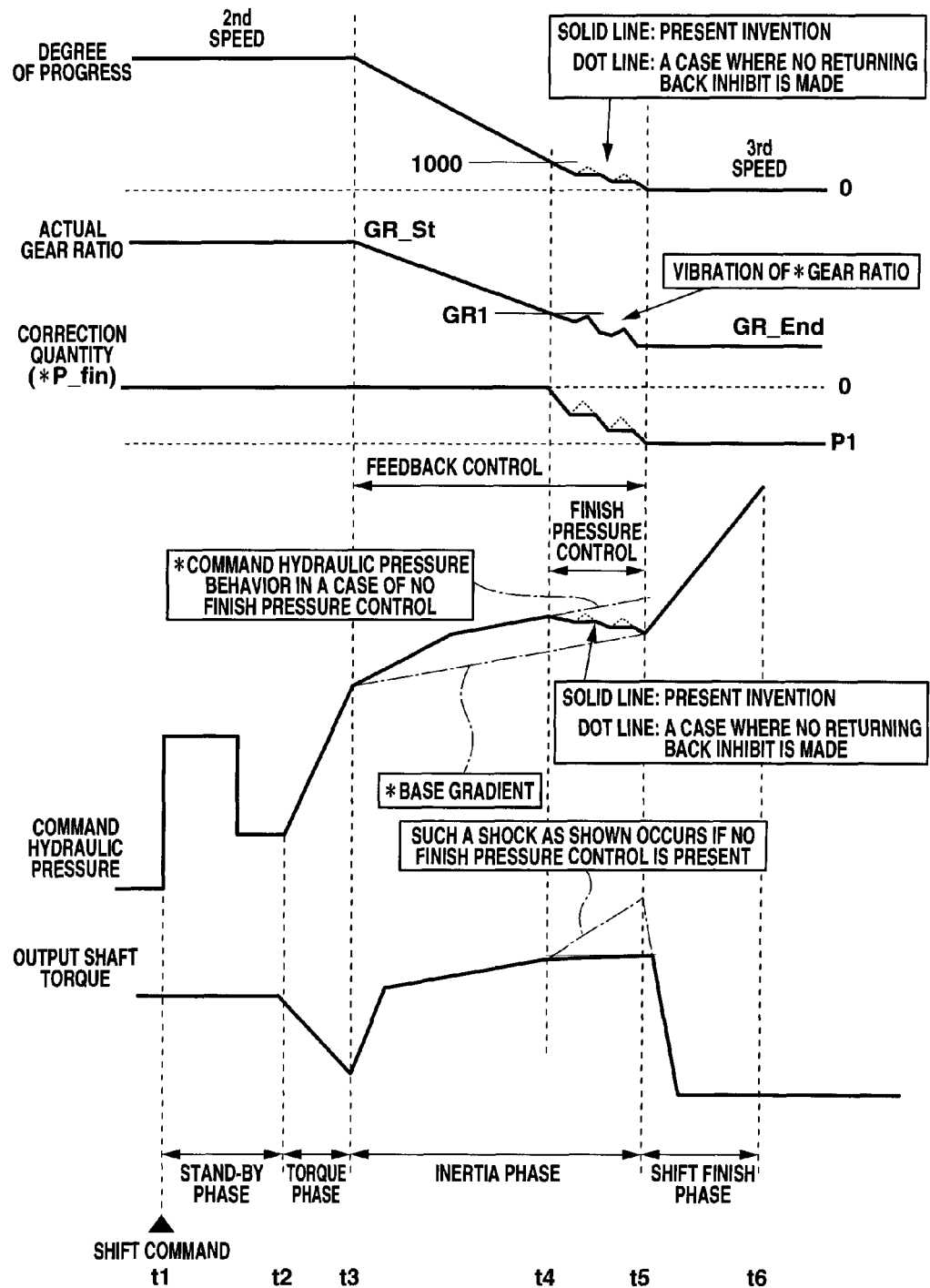
FIG. 8 is a timing chart representing each characteristic of a degree of progress, an actual gear ratio, correction quantity (P_fin), a command hydraulic pressure, and an output shaft torque at a time at which an up-shift from a second speed to a third speed in the automatic transmission in the embodiment described above is issued.

Next, an action of the gear shift control apparatus in the embodiment described above will be explained hereinbelow. The action in the gear shift control apparatus for the automatic transmission in the embodiment will be explained with "gear shift control action", "inertia phase control action", and "a finish pressure control action with respect to the engagement side frictional engagement element during the up-shift". FIG. 8 shows a timing chart representing each characteristic of the degree of progress, the actual gear ratio, feedback correction quantity (P_fb), the command hydraulic pressure, and the output shaft torque for the engagement side frictional engagement element during the up-shifting.

[Gear Shift Control Action]

For example, in a state in which the vehicle travels at a drive point A on the gear shift diagram in FIG. 3, the gear shift control action in a case where the up-shift command from the second speed to the third speed crossing over a corresponding up-shift line will be described with reference to the flowchart of FIG. 4.

When the up-shift command to shift the gear ratio from the second speed to the third speed is outputted, the routine shown in FIG. 4 is advanced from steps S40→S41→S43 and the stand-by phase control is executed at step S43.

Then, when the stand-by phase control at step S43 is finished, the flow of steps S43, S44, S45, and S46 is repeated. At step S46, the engagement pressure control and the release pressure control according to the torque phase control are executed for second clutch C2 (the engagement side frictional engagement element) and third clutch C3 (the release side frictional engagement element) related to the up-shift from the second speed to the third speed.

Then, when actual gear ratio GR is, at step S45, determined to have reached to inertia phase start determination gear ratio GR_St, the flow of steps S45, S47, S48, S49, and S50 is repeated in the flowchart of FIG. 4. At step S49, the engagement pressure control and the release pressure control according to the inertia phase control for second clutch C2 and third clutch C3 are executed. At this time, the inertia phase control including the finish pressure control is executed in accordance with the flowchart of FIG. 5 for second clutch C2 which is the engagement side frictional engagement element on the up-shift from the second speed to the third speed.

Then, when the determination that actual gear ratio GR has reached to inertia phase finish determination gear ratio GR_End is made, in the flowchart of FIG. 4, the routine goes from step S50 to step S51. At step S51, the engagement pressure control and the release pressure control according to the gear shift finish phase control are executed for second clutch C2 and third clutch C3. It should be noted that, when the gear shift finish phase control is finished, the routine returns to step S40.

Hence, during the up-shift from the second speed to the third speed, as shown in FIG. 8, the up-shift command from the second speed to the third speed is issued at a time point t1. At this time, during a time period from time point t1 to a time point t2, oil is filled within a piston chamber for second clutch C2 which is the engagement side frictional engagement element. At this time period, the stand-by control in which the gap between clutch plates is eliminated and the torque transmission is possible for engagement of clutch plates due to the thereafter hydraulic pressure supply is executed.

Then, the stand-by phase control is finished at time point t2. As shown in FIG. 8, the torque phase control is executed in which only an output shaft torque is reduced without a variation of the input revolutions (actual gear ratio) for second clutch C2 which is the engagement side frictional engagement element of the up-shift from second speed→third speed and for third clutch C3 which is the release side frictional engagement element thereof.

Then, when actual gear ratio GR has reached to inertia phase start determination gear ratio GR_St at time point t3, the inertia phase control is executed for second clutch C2 which is the engagement side frictional engagement element on the up-shift from the second speed to the third speed and third clutch C3 which is the release side frictional engagement element thereon in which a variation in the output shaft torque is suppressed while the input revolutions (actual gear ratio) are varied at a time period from time point t3 to time point t5 as shown in FIG. 8. At this time, the inertia phase control including the finish pressure control is executed in accordance with the flowchart shown in FIG. 5 during a time period from a time point t4 to time point t5 for second clutch C2 which is the engagement side frictional engagement element.

Then, when actual gear ratio GR has reached to inertia phase finish determination gear ratio GR_End at time point t5, during a time point from time point t5 to a time point t6, as shown in FIG. 8, a gear shift finish phase control in which the engagement pressure to second clutch C2 which is the engagement side frictional engagement element of the up-shift from the second speed→(to) the third speed is raised in a short time to a line pressure and the release pressure of third clutch C3 which is the release side frictional engagement element is reduced to a drain pressure is executed in a short time.

[Inertia Phase Control Action]

The action of the inertia phase control which is applicable to the engagement pressure control of the engagement side frictional engagement element and in which the actual gear ratio is varied to an up-shift direction which is a gear shift progress direction to start the inertia phase will be explained with reference to the flowchart of FIG. 5.

First, the inertia phase control is started. At a time point at which the inertia phase control is started, the degree of progress indicates a value equal to or larger than 1000. In the flowchart of FIG. 5, the routine goes from step S60→(via) step S61→step S63→step S64 to step S69. Then, at step S69, command hydraulic pressure P (=P_base+P_fb) for second clutch C2 which is the engagement side frictional engagement element during the up-shift is determined. Until the degree of progress is smaller than 1000, the flow stream from step S60 to step S69 via steps S61, S62, S63, and S64 is repeated. At step S69, command hydraulic pressure P is determined from an equation of P=P_base+P_fb.

Then, when the degree of progress is smaller than 1000 and actual gear ratio GR is varied toward the up-shift side, in the flowchart of FIG. 5, the routine goes from steps S60 to S69 via steps S61, S62, S63, S65, S67, and S69. Thereafter, at step S67, reduction quantity P_fin is interpolation calculated on a basis of the present degree of progress. At step S69, command hydraulic P (P=P_base+P_fb+P_fin) for second clutch C2 which is the engagement side frictional engagement element at the time of the up-shift is determined by adding together a base gradient P_base set at step S60, and an FB (feedback) correction quantity P_fb calculated at step S61, and reduction quantity P_fin (a negative value) interpolation calculated at step S67.

On the other hand, if the degree of progress is smaller than 1000 and actual gear ratio GR is varied toward the down-shift side, steps S60, S61, S63, S65, and S66 are processed in the flowchart of FIG. 5 and the routine goes to step S69. Then, at step S66, the interpolation calculation of reduction quantity P_fin is calculated on a basis of the rewritten present degree of progress (=the previous degree of progress). At step S69, command hydraulic pressure P (=P_base+P_fb+P_fin) for second clutch C2 which is the engagement side frictional engagement element during the up-shift time is calculated. That is to say, in a case where actual gear ratio GR toward the down-shift side is varied, a value of reduction quantity P_fin immediately before the variation is maintained.

Then, if the degree of progress is equal to or lower than 0, in the flowchart in FIG. 5, the steps of S60, S61, S62, and S68 are processed. Then, at step S68, reduction quantity P_fin is set to maximum reduction quantity P1 at step S68. At step S69, automatic transmission controller 20 determines command hydraulic pressure P (=P_base+P_fb+P1) for clutch C2 which is the engagement side frictional engagement element during the up-shift by adding base gradient P_base set at step S68, FB correction quantity P_fb calculated at step S61, and maximum reduction quantity P1 (negative maximum value) set at step S68.

Hence, the characteristic of reduction quantity P_fin in the inertia phase control is set to 0 since the degree of progress≧1000 until actual gear ratio is in a state from inertia phase start determination gear ratio GR_St to inertia phase finish immediate prior gear ratio GR1. During a period of time from a time point at which inertia phase finish immediate prior gear ratio to a time point at which inertia phase finish determination gear ratio GR_End, 1000>degree of progress>0. Thus, while reduction quantity P_fin is maintained in a case of the degree of progress in the opposite direction. If actual gear ratio GR is equal to or larger than inertia phase finish determination gear ratio GR_End, the degree of progress≦0, reduction quantity P_fin is set to maximum reduction quantity P1.

[Finish Pressure Control Action for the Engagement Side Frictional Engagement Element During the Up-Shift]

Such features as described below are provided. Finish pressure control in the embodiment is, at first, to reduce the hydraulic pressure while the follow-up to the gear ratio. Secondly, when the gear ratio is returned back (vibrated) with respect to the gear shift progress direction, the hydraulic pressure does not follow this gear ratio. Thirdly, the reduction quantity of the hydraulic pressure is set on a basis of the degree of progress of the gear shift. Fourth, the reduction quantity of command hydraulic pressure P is the reduction quantity in accordance with the input torque. The respective features will be explained below.

(Gear Ratio Follow-Up)

In a region immediately prior to the finish of the inertia phase (inertia phase finish immediately prior region), the finish pressure control to reduce the engagement side hydraulic pressure in a stepwise manner is well known in the art. In this case, the shock can more remarkably be reduced which is developed when an oblique (by a predetermined gradient) reduction in the hydraulic pressure is made as compared with the stepwise reduction in the hydraulic pressure. Then, when, in the inertia phase finish immediate prior region, the hydraulic pressure is designed to be reduced by a certain predetermined quantity, the hydraulic pressure is designed on a basis of the gradient and development man-hour and compatibility man-hour are needed to take. In other words, the reduction quantity of the hydraulic pressure to be reduced to the finish of the inertia phase and a time it takes from the time at which the inertia phase finish immediate prior region are needed.

Hence, in this embodiment, the hydraulic pressure is reduced by following up to the gear ratio. In this case, the gear ratio is automatically varied toward the gear ratio at the time of the finish of the inertia phase in the inertia phase. Thus, if the hydraulic pressure is reduced by the follow-up to the gear ratio, the hydraulic pressure can be reduced by the certain predetermined quantity at the time of the finish of the inertia phase even if the time duration of the inertia phase finish immediately prior region is varied.

In addition, the shock developed in the inertia phase finish region (area) is a shock as the control phase becomes nearer to the finish of the inertia phase, the shock becomes larger. Hence, since the reduction quantity of command hydraulic pressure is set for each predetermined time (whenever a predetermined time is elapsed) on a basis of the gear ratio in the inertia phase finish area (region), the command hydraulic pressure at the inertia phase finish area (region) can progressively be reduced. Because of this, for example, the shock developed in the inertia phase finish area (region) can effectively be reduced rather than the case of the reduction in the hydraulic pressure in the stepwise manner at the inertia phase finish area (region).

Furthermore, since command hydraulic pressure P is reduced on a basis of the gear ratio, the development man-hours and the compatibility man-hours can be reduced. In details, in a case where a feed-forward causes the hydraulic pressure to be reduced by the predetermined quantity at the inertia phase finish area (region), a time it takes from the inertia phase finish immediate prior timing to the inertia phase finish timing is set to design the reduction quantity of the hydraulic pressure for each predetermined time (whenever the predetermined time has elapsed). Thus, the development man-hours and the compatibility man-hours are needed. However, since the command hydraulic pressure can automatically be reduced on a basis of the gear ratio, without setting the time duration from the timing at which the inertia phase finish immediately prior timing occurs to the timing at which the inertia phase finish, command hydraulic pressure P can automatically be reduced in accordance with the variation in the gear ratio.

(Returning Back Inhibit)

However, a disadvantage of adopting a technique in which the hydraulic pressure is reduced in a follow-up relationship to the gear ratio is as follows. In a case where the gear ratio is vibrated as shown by an actual gear ratio characteristic in FIG. 8, as shown in dot line characteristics of correction quantity (reduction quantity P_fin) and command hydraulic P, the correction quantity (reduction quantity P_fin) and command hydraulic pressure P follow up the gear ratio vibration. The reason for the gear ratio to be vibrated in the finish area (region) of the inertia phase is that, as the control phase becomes nearer to the finish area (region) of the inertia phase, a relative revolution speed in the frictional engagement element becomes smaller. Then, it becomes an unstable state such that a frictional coefficient is raised, thereafter, is reduced, and is again raised.

Then, if the hydraulic pressure supplied to a certain clutch is set on a basis of the gear ratio, the detection value of the gear ratio is in a vibration state. At this time, even if the gear ratio is varied in an opposite direction to the gear shift direction, the hydraulic pressure supplied to the clutch follows the vibration of the gear ratio and the command hydraulic pressure (=engagement hydraulic pressure) is vibrated. The vibration is felt by the driver and there is a possibility that the vibration of the gear ratio becomes worse.

In order to avoid such a disadvantage as described above, when the gear ratio is returned back (vibrated) with respect to the gear shift progress direction as denoted by a solid line characteristic of the correction quantity in FIG. 8, the hydraulic pressure does not follow the gear ratio. Therefore, in a case where the gear ratio is varied in an opposite direction to the gear shift progress direction, the hydraulic pressure supplied to the clutch is set to be held at the previous value. Thus, as shown in the solid line characteristic of the command hydraulic pressure of FIG. 8, command hydraulic P (=engagement hydraulic pressure) can be prevented from being vibrated following the vibration of the gear ratio.

(Setting of the Reduction Quantity of the Hydraulic Pressure According to the Degree of Progress of the Gear Shift)

If the reduction quantity of the hydraulic pressure on a is basis of the gear ratio itself, it is necessary to change the control since the gear ratio progress direction is different in up-shift and the down-shift.

Whereas, as shown in FIG. 6A, the reduction quantity of the hydraulic pressure on a basis of the degree of progress of the gear shift, a common control logic to the up-shift and down-shift can be taken so that control can be simplified.

(Setting of the Command Hydraulic Pressure Reduction Quantity in Accordance with the Input Torque)

If the command hydraulic pressure reduction quantity is provided for a predefined fixed value, the shock at the inertia phase finish area (region) in accordance with a magnitude of the input torque is varied. Thus, a case where the shock cannot appropriately be reduced occurs.

Whereas, as shown in FIG. 6B, the reduction quantity of the command hydraulic is the reduction quantity in accordance with the turbine torque (=input torque). Thus, in spite of the fact that the magnitude of the input torque, the shock in the inertia phase finish area (region) can appropriately be reduced.

Next, advantages in the embodiment described above according to the present invention will be explained hereinbelow. The gear shift control apparatus for the automatic transmission in the embodiment described above has the advantages as will be described below.

(1) A gear shift control apparatus for an automatic transmission comprising: gear shift control means (the gear shift control section of FIG. 4) for releasing the first frictional engagement element which has been engaged at a gear stage prior to a gear shift and for engaging the second frictional engagement element with which has been released at the gear stage prior to the gear shift to perform the gear shift to the other gear stage; and inertia phase control means (the inertia phase control section in FIG. 5) for temporarily reducing command hydraulic P to the second frictional engagement element when the gear ratio detected during the gear shift to the other gear stage has reached to a set gear ratio representing an inertia phase finish immediate prior region, at a time of an inertia phase developed during a replacement gear shift, wherein the inertia phase control means (inertia phase control section in FIG. 5) includes a finish pressure control section (steps S62 through S68) configured to set a reduction quantity of command hydraulic pressure P to the second frictional engagement element whenever a predetermined time has elapsed on a basis of gear ratio GR detected whenever the predetermined time has elapsed in the inertia phase finish immediate prior region and to reduce progressively command hydraulic pressure P. Consequently, at the time of the inertia phase developed during the replacement gear shift, the shock developed at the inertia phase finish area (region) can effectively be reduced without requiring many development man-hours and compatibility man-hours.

(2) The finish pressure control section (step S62 through step S68) is, furthermore, configured to hold the reduction quantity of the command hydraulic pressure to a previous value when the gear ratio detected for each predetermined time (whenever the predetermined time has elapsed) in the inertia phase finish immediate prior region is varied in an opposite direction to a direction in which the gear ratio is to be varied due to the gear shift to another gear ratio (step S65→step S66→step S67). At this time, in a case where the gear ratio is vibrated in the inertia phase finish immediately prior region, command hydraulic pressure P can be prevented from being vibrated following up the vibration of the gear ratio.

(3) The gear shift control means (FIG. 4) is provided with degree of progress calculating section (step S48) for calculating a degree of progress of the gear shift to the other gear stage and the gear shift control means (section) (FIG. 5) includes the finish pressure control section (steps S62~step S68) configured to set the reduction quantity of the command hydraulic pressure for each predetermined value on a basis of the degree of progress in the inertia phase finish immediate prior region and holds the reduction quantity of the command hydraulic pressure to the previous value when the gear shift is not progressed (unadvanced) (the degree of progress of the gear shift is smaller) than the state previously calculated degree of progress. Therefore, a common control logic between the up-shift and down-shift can be achieved and the control can be simplified.

(4) The finish pressure control section (step S62~step S68) is structured so that the reduction quantity of the command hydraulic pressure is set for the reduction quantity of the command hydraulic pressure becomes large, as the input torque to the automatic transmission detected during the gear shift to the other gear stage becomes large (FIG. 6B). Thus, in spite of the magnitude of the input torque, the shock in the inertia phase finish area (region) can appropriately be reduced.

The gear shift control apparatus for the automatic transmission has been heretofore explained on a basis of the embodiment. However, a specific structure is not limited to the above-described embodiment. Design modification and addition are allowed without a departure from a gist of invention related to each claim.

In the embodiment, an example of the finish pressure control which reduces the engagement hydraulic pressure of the engagement side frictional engagement element at the up-shift to reduce the shock in the inertia phase finish area during the power-on up-shift is illustrated. However, the finish pressure control according to the present invention is applicable to a case where the engagement hydraulic pressure to the engagement side frictional engagement element during the down-shift (operation) is reduced to reduce the shock in the inertia phase finish area (region) in the power off down-shift.

In the embodiment described above, the example of setting the reduction quantity of the command hydraulic pressure on a basis of the turbine torque is illustrated. However, another information closely related to the input torque to the automatic transmission detected during the gear shift to the other gear stage (for example, an engine torque or the accelerator opening angle) may be used as an indirect transmission input torque information. In either case, as compared with a case where the reduction quantity of the command hydraulic pressure wholly neglecting the input torque to the automatic transmission is set, the gear shift control apparatus according to the present invention can have an effect of appropriately reducing the shock.

In the above-described embodiment, the control is executed using the degree of progress of the gear shift calculated on a basis of the gear ratio. However, for example, the turbine revolution speed may be used as a parameter indicating a degree of progress of the gear shift.

The above-described embodiment is an example of application of the gear shift control apparatus for the geared automatic transmission of forward 7-th speed, reverse 1-st speed. It is naturally applicable to the other geared (automatic) transmission having a plurality of forward gear shift stages.

This application is based on a prior Japanese Patent Application No. 2008-160703 filed in Japan on Jun. 19, 2008. The entire contents of Japanese Patent Applications No. 2008-160703 with a filing date of Jun. 19, 2008 are hereby incorporated by reference. Although the invention has been described above by reference to the certain embodiment of the invention, the present invention is not limited to the embodiment described above. Modifications and variations of the embodiment described above will occur to those skilled in the art in light of the above teachings. The scope of the invention is defined with reference to the following claims.

What is claimed is:

1. A gear shift control apparatus for an automatic transmission, comprising:
    gear shift control means for releasing a first frictional engagement element which has been engaged at a gear stage prior to a gear shift and to engage a second frictional engagement element which has been released at the gear stage prior to the gear shift to perform the gear shift to another gear stage; and
    inertia phase control means for temporarily reducing a command hydraulic pressure to the second frictional engagement element when a parameter indicating a degree of progress of the gear shift detected during the gear shift to the another gear stage has reached a predetermined value representing an inertia phase finish immediate prior region at a time of an inertia phase developed during a replacement gear shift, wherein the inertia phase control means includes finish pressure control means for setting a reduction quantity of the command hydraulic pressure whenever a predetermined time has elapsed on a basis of the parameter detected whenever the predetermined time has elapsed in the inertia phase finish immediate prior region to progressively reduce the command hydraulic pressure.

2. The gear shift control apparatus for the automatic transmission as claimed in claim 1, wherein the finish pressure control means is further for holding the reduction quantity of the command hydraulic pressure at a previous value when the parameter detected, whenever the predetermined time has elapsed in the inertia phase finish immediate prior region, is varied in a direction opposite to a direction toward which the parameter is to be varied.

3. The gear shift control apparatus for the automatic transmission as claimed in claim 2, wherein the gear shift control means includes a degree of progress calculating means for calculating a degree of progress of the gear shift to the another gear stage on a basis of a gear ratio calculated whenever the predetermined time has elapsed, the finish pressure control means included in the inertia phase control means and for further setting the reduction quantity of the command hydraulic pressure whenever the predetermined time has elapsed on a basis of the degree of progress of the gear shift in the inertia phase finish immediate prior region calculated whenever the predetermined time has elapsed and configured to hold the reduction quantity of the command hydraulic pressure at the previous value when the degree of progress of the gear shift is a state in which the degree of progress of the gear shift is smaller than the degree of progress previously calculated.

4. The gear shift control apparatus for the automatic transmission as claimed in claim 3, wherein the finish pressure control means is further for setting the reduction quantity of the command hydraulic pressure to be negatively larger as the degree of progress of the gear shift to the another stage becomes smaller.

5. The gear shift control apparatus for the automatic transmission as claimed in claim 4, wherein, when the degree of progress of the gear shift becomes equal to or smaller than zero, a maximum reduction quantity of the command hydraulic pressure is set to the reduction quantity of the command hydraulic pressure which becomes negatively larger as an input torque to the automatic transmission becomes larger.

6. The gear shift control apparatus for the automatic transmission as claimed in claim 5, wherein the degree of progress calculating means for calculating the degree of progress uses an actual gear ratio as follows:

$$\text{degree of progress} = (GR\_End - GR) \times 1000 / (GR\_End - GR1),$$

wherein GR_End denotes an inertia phase finish determination gear ratio, GR denotes a present actual gear ratio, and GR1 denotes an inertia phase finish immediate prior gear ratio.

7. The gear shift control apparatus for the automatic transmission as claimed in claim 6, wherein the inertia phase control means is further for calculating the command hydraulic pressure to be supplied to the second frictional engagement element by adding a base gradient set on a basis of a turbine torque and a vehicle speed obtained from an output shaft revolution speed sensor, a feedback correction quantity calculated on a basis of a turbine revolution speed obtained from a first turbine speed sensor and a second turbine speed sensor and the output shaft revolution speed obtained from the output shaft revolution speed sensor, and the reduction quantity obtained through an interpolation thereof on a basis of the degree of progress.

8. The gear shift control apparatus for the automatic transmission as claimed in claim 7, wherein the reduction quantity of the command hydraulic pressure is set to 0 when the actual gear ratio indicates a value from the inertia phase finish determination gear ratio to the inertia phase immediate prior gear ratio, the reduction quantity thereof is set to a value which is progressively reduced in accordance with the degree of progress thereof to the another gear stage when the actual gear ratio indicates a value from the inertia phase finish immediately prior gear ratio to the inertia phase finish determination gear ratio, and the reduction quantity thereof is set to the maximum reduction quantity when the actual gear ratio is equal to or larger than inertia phase finish determination gear ratio.

9. The gear shift control apparatus for the automatic transmission as claimed in claim 8, wherein the actual gear ratio is detected from an input shaft revolution speed obtained from the first turbine speed sensor and the second turbine speed sensor and obtained from the output shaft revolution speed sensor whenever the predetermined time has elapsed.

10. The gear shift control apparatus for the automatic transmission as claimed in claim 1, wherein the finish pressure control means is further for setting the reduction quantity of the command hydraulic pressure in order for the reduction quantity of the command hydraulic pressure to become larger, as an input torque to the automatic transmission detected during the gear shift to the another gear stage becomes larger.

11. A gear shift control method for an automatic transmission, comprising:
 while releasing a first frictional engagement element which has been engaged at a gear stage prior to a gear shift, engaging a second frictional engagement element which has been released at the gear stage prior to the gear shift to perform the gear shift to another gear stage; and
 temporarily reducing a command hydraulic pressure to the second frictional engagement element when a parameter indicating a degree of progress of the gear shift detected during the gear shift to the other gear stage has reached to a predetermined value representing an inertia phase finish immediate prior region at a time of an inertia phase developed during a replacement gear shift, wherein a reduction quantity of the command hydraulic pressure is set whenever a predetermined time has elapsed on a basis of the parameter detected whenever the predetermined time has elapsed in the inertia phase finish immediate prior region to progressively reduce the command hydraulic pressure.

* * * * *